US008280702B2

(12) United States Patent
Herman

(10) Patent No.: US 8,280,702 B2
(45) Date of Patent: Oct. 2, 2012

(54) VEHICLE ASPECT CONTROL

(75) Inventor: Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 648 days.

(21) Appl. No.: 12/169,297

(22) Filed: Jul. 8, 2008

(65) Prior Publication Data

US 2010/0010793 A1 Jan. 14, 2010

(51) Int. Cl.

*G06F 7/60* (2006.01)
*G06F 17/10* (2006.01)
*G06G 7/78* (2006.01)
*G08G 1/16* (2006.01)

(52) U.S. Cl. ........................................ 703/2; 701/301

(58) Field of Classification Search .................... 434/14; 701/301; 703/2

See application file for complete search history.

(56) References Cited

U.S. PATENT DOCUMENTS 4,424,038 A 1/1984 Tingleff et al.
4,760,396 A 7/1988 Barney et al.
4,797,839 A 1/1989 Powell
4,812,990 A 3/1989 Adams et al.
4,947,350 A 8/1990 Murray et al.
4,959,015 A 9/1990 Rasinski et al.
5,404,516 A 4/1995 Georgiades et al.
5,421,728 A 6/1995 Milden
5,458,041 A 10/1995 Sun et al.
5,508,928 A 4/1996 Tran
5,572,213 A 11/1996 Noneman et al.
5,635,662 A 6/1997 Robertson et al.
5,787,333 A 7/1998 Rasinski et al.
5,838,262 A 11/1998 Kershner et al.
5,844,602 A 12/1998 Lareau et al.
5,883,586 A 3/1999 Tran et al.
5,969,676 A 10/1999 Tran et al.
5,992,288 A * 11/1999 Barnes ........................... 89/1.11
6,199,470 B1 3/2001 Dewan et al.
6,222,464 B1 * 4/2001 Tinkel et al. .................. 340/945

(Continued)

FOREIGN PATENT DOCUMENTS

JP 2002195795 A 7/2002

OTHER PUBLICATIONS

Vries et al. "Integrated conflict resolution for efficient autonomous hazard avoidance", Oct. 21-25, 2007, Digital Avionics Systems Conference, IEEE/AIAA, pp. 5.B.1-1 to 5.B.1-11.*

(Continued)

*Primary Examiner* — Suzanne Lo

(74) *Attorney, Agent, or Firm* — Miles & Stockbridge P.C.

(57) ABSTRACT

A computer system and method for determining a survivability aspect control signal for an aircraft is disclosed. The computer system can include a processor and a memory including software instructions adapted to cause the computer system to perform a series of steps. The steps can include providing a plurality of signature exposure models, each signature exposure model corresponding to a threat sensor and including a threat sensor characteristic and a threat operational characteristic. A portion of a mission can be selected along with one or more of the models based on the selected mission portion. The steps can include calculating a signature exposure index based on the one or more selected models and the selected mission portion and providing a survivability aspect control signal based on the signature exposure index.

24 Claims, 7 Drawing Sheets

U.S. PATENT DOCUMENTS

| | | | |
|---|---|---|---|
| 6,231,003 | B1 | 5/2001 | Hibma et al. |
| 6,267,039 | B1 | 7/2001 | Czarnecki |
| 6,497,169 | B1 | 12/2002 | Khosla |
| 6,771,205 | B1 | 8/2004 | Barton et al. |
| 6,806,828 | B1 | 10/2004 | Sparrow et al. |
| 6,997,715 | B2 * | 2/2006 | Perry et al. ...................... 434/11 |
| 7,447,593 | B2 * | 11/2008 | Estkowski et al. ............ 701/301 |
| 2002/0150866 | A1 | 10/2002 | Perry et al. |
| 2003/0019350 | A1 | 1/2003 | Khosla |
| 2003/0142005 | A1 | 7/2003 | Bar-Avi et al. |
| 2003/0205126 | A1 | 11/2003 | O'Neill |
| 2003/0215771 | A1 | 11/2003 | Bartoldus et al. |
| 2004/0030463 | A1 | 2/2004 | Stockdale et al. |
| 2005/0038628 | A1 | 2/2005 | Beuttel et al. |
| 2005/0073439 | A1 | 4/2005 | Perricone |
| 2005/0256682 | A1 | 11/2005 | Galutia et al. |
| 2006/0000988 | A1 | 1/2006 | Stuart et al. |
| 2007/0210953 | A1 * | 9/2007 | Abraham et al. ............... 342/29 |
| 2007/0244673 | A1 * | 10/2007 | Khosla et al. ..................... 703/2 |

OTHER PUBLICATIONS

Blyenburgh, P. "UAVs—Current situation and considerations for the way forward", Sep. 17-19, 1999, Development and Operation of UAVs for Military and Civil Applications, 28 pages.*

Markoff, J. "Crashes and Traffic Jams in Military Test of Robotic Vehicles", Nov. 5, 2007, NY Times, 3 pages.*

Li et al. "Particle Swarm of Optimization for Route Planning of Unmanned Aerial Vehicles", Aug. 20-23, 2006, Proc. of International Conference on Information Acquisition, IEEE, pp. 1213-1218.*

Spenko et al. "High speed hazard avoidance for unamnned ground vehicles in emergency situations", Sep. 20, 2006, 8 pages.*

Monte Carlo Method from Wikipedia Oct. 3, 2006, 6 pages.

* cited by examiner

VEHICLE ASPECT CONTROL

Embodiments of the present invention relate generally to aircraft survivability and, more particularly, to methods and systems for determining and providing a flight aspect control signal, or recommendation signal, calculated to affect own-ship signature exposure to one or more threats.

Military aircraft and rotorcraft face an increasingly lethal and proliferated multi-spectral threat from weapon mounted sensors. A need may exist to consider these various sensor spectrums and technologies in order to determine an operation of an aircraft that reduces the signature (or detectable presentation) of the aircraft to one or more of the weapon mounted sensors. Further, a need may exist to consider a combined signature exposure to one or more of the sensors.

One embodiment includes a computer system for determining a survivability aspect control signal for an aircraft. The computer system can include a processor and a memory including software instructions adapted to cause the computer system to perform a series of steps. The steps can include providing a plurality of signature exposure models, each signature exposure model corresponding to a threat sensor and including a threat sensor characteristic and a threat operational characteristic. A portion of a mission can be selected along with one or more of the models based on the selected mission portion (or mission phase). The steps can include calculating a signature exposure index based on the one or more selected models and the selected mission portion and providing a survivability aspect control signal based on the signature exposure index.

Another embodiment can include a method for generating a survivability aspect signal for a vehicle. The method can include providing a signature exposure model, where the signature exposure model corresponds to a threat sensor and includes a threat sensor characteristic and a threat operational characteristic. A mission portion can be selected along with the model based on the selected mission portion. The method can include calculating a signature exposure index based on the selected model and the selected mission portion and providing a survivability aspect control signal based on the signature exposure index.

Another embodiment can include a computer program product for calculating an aspect control signal for a vehicle. The computer program product can include a computer readable medium encoded with software instructions that, when executed by a computer, cause the computer to perform predetermined operations. The predetermined operations can include a series of steps. The steps can include providing a plurality of signature exposure models, each signature exposure model corresponding to a threat sensor and including a threat sensor characteristic. The steps can also include selecting a mission portion and selecting one or more of the models based on the selected mission portion. The steps can include calculating a signature exposure index based on the one or more selected models and the selected mission portion, and providing an aspect control signal based on the signature exposure index.

DETAILED DESCRIPTION

While aircraft and rotorcraft are used as examples in this application for illustration purposes, it should be appreciated that the methods, systems and software of various embodiments can be used with military vehicles, spacecraft, commercial vehicles, private vehicles, unmanned aircraft and vehicles, autonomous machines or vehicles, and/or any type of machine or vehicle where a determination of survivability may be useful or desired. Vehicles, as used herein, is intended to refer to any type of transportation apparatus including, but not limited to, airplanes, helicopters, rockets, missiles, gliders, lighter-than-air craft, unmanned aerial vehicles (UAVs), cars, trucks, motorcycles, tanks, military ground transports, heavy equipment, naval vessels, watercraft, submarines, hover craft, human powered vehicles, and/or the like.

It will also be appreciated that embodiments of the aircraft survivability aspect control system and method can provide a control signal for directly or indirectly controlling a flight aspect in the form of an electronic signal communicated to another piece of avionics equipment or in human recognizable form such as an audible, visual or tactile signal for communication to a pilot or other crew member. An aspect control signal may control the vehicle aspect or may provide a recommendation for controlling the vehicle aspect, for example.

The distinction between control and recommendation can be understood when embodiments are used, for example, in a UAV and a piloted aircraft. In a UAV, a control signal may be appropriate, while in a piloted aircraft a recommendation or warning signal may be appropriate. However, either manned or unmanned aircraft can include an embodiment that does one or both of control and recommend. For example, a piloted aircraft may include an embodiment that allows for the selectable use of a control input or a recommendation input. Similarly, a UAV avionics system may at times request a control input and at other times request a recommendation so that the survivability aspect signal does not interrupt completion of a higher priority objective (the same may apply to a manned aircraft). In other words, there may be times when survivability aspect control can be preempted based on the priority of another mission objective, such as destroying a target or in an emergency situation.

Figure 1:
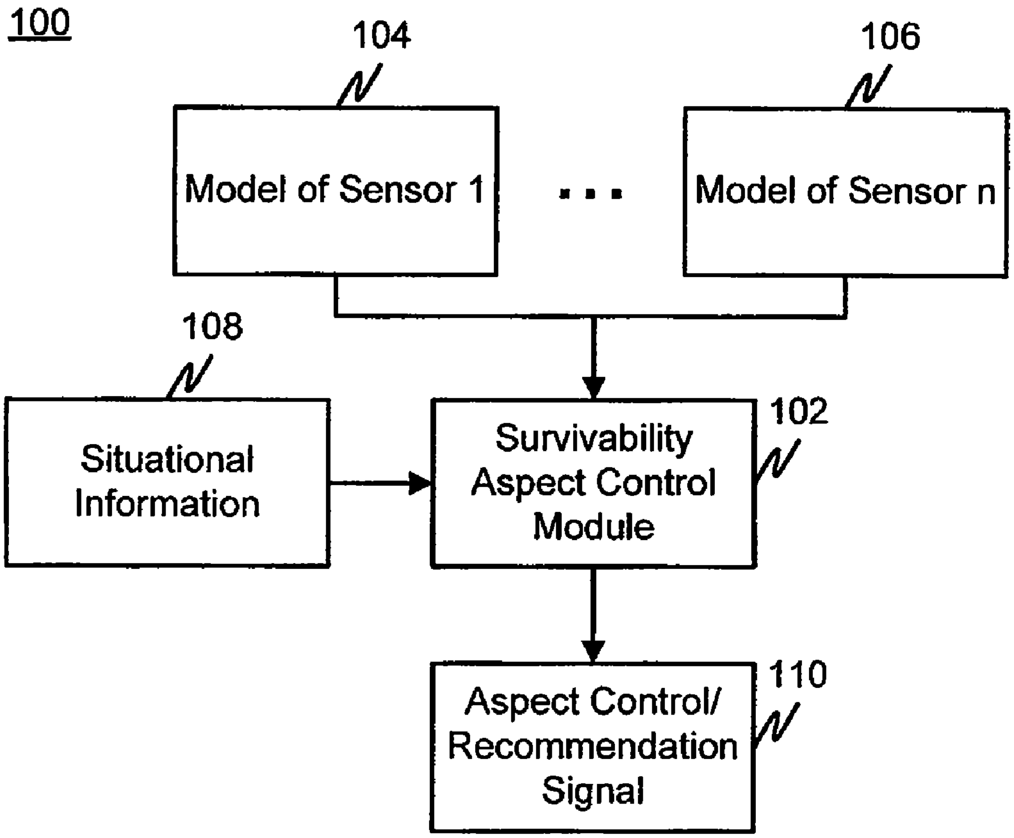
FIG. 1 is a block diagram of an exemplary embodiment of an aspect control system.

FIG. 1 is a block diagram of an exemplary embodiment of a survivability aspect control system 100. System 100 can include a survivability aspect control module 102 that can receive input from a plurality of models of sensors (104-106), and situational information 108. The survivability aspect control module 102 can provide as output an aspect control signal or recommendation 110.

In operation, the survivability aspect control module 102 can receive one or more models of threat sensor systems (104 and 106). These models can correspond to threats that are expected to be encountered by an aircraft during a particular mission or threats associated with an area of operation, and can include, for example, a model of human perception of a characteristic of the aircraft. The threat sensor models 104 and 106 can provide information that allows the survivability aspect control module 102 to determine an exposure index for the aircraft and what effect aircraft orientation, location, or other operational aspect has on the exposure to the threat sensor. The threat sensor models 104 and 106 can also include information about performance and/or operational characteristics of the threat weapon system. This information can be considered along with the exposure information to determine a survivability aspect control signal.

It will be appreciated that the survivability aspect control module 102 can include electronics, computer hardware, software or a combination of the above. It will also be appreciated that the module can be constituted by a single electronic and/or software module or can be distributed across multiple modules of the same or different type.

In addition to the threat sensor model 104 and 106 input, the survivability aspect control module 102 can receive situational information 108 as input. The situational information 108 can include time, distance to targets, threats or waypoints, relative or absolute location/position information, current aircraft aspect, visible threats, or the like. Generally, any situational or operational information that could be used for determining a survivability aspect control signal can be supplied as situational information 108.

Using the information supplied via the threat sensor models 104 and 106 and the situational information 108, the survivability aspect control module 102 determines a survivability aspect control (or recommendation) signal 110 to be provided as output.

The survivability aspect control signal can include a control indication for one or more operational aspects, such as heading and altitude, for example. The control indication can be in the form of a single control signal indication for each aspect, for example "descend and maintain 10,000 feet and fly heading 130°." Or, the control indication can include one or more ranges for each aspect (e.g., "descend below 5,000 feet and fly a heading between 115° and 175°"), where the ranges have been determined to be acceptable for survivability (e.g., based on a threshold). For example, the ranges can include those headings at which the signature exposure index value is below that needed by one or more of the weapons systems to engage the aircraft, and thus the pilot or flight management system can select from among the range(s) of values provided by the survivability aspect control module 102. This can allow the pilot or flight management system to choose an aspect, within the indicated ranges, based on another factor in addition to survivability. In addition to providing a survivability aspect control signal, the survivability aspect control module can also provide one or more additional signals that can indicate other factors related to, and augmenting, the survivability aspect control signal, such as relative level of SEI for the present flight attitude, a warning if indicated aspect control may exceed an operational envelope of the aircraft, a warning if threat engagement is estimated to be imminent, or the like.

Figure 2:
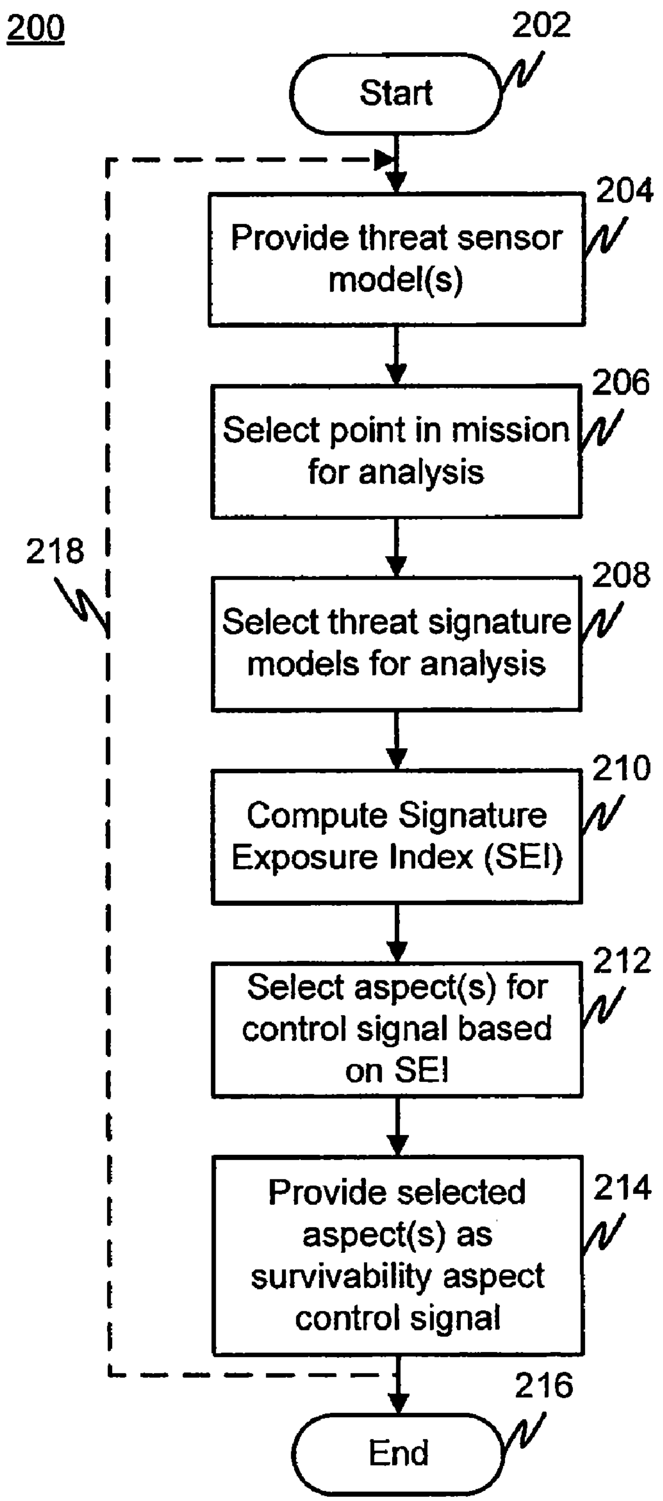
FIG. 2 is a flowchart showing an exemplary method for aircraft survivability aspect control.

FIG. 2 shows a flowchart of an exemplary method 200 for aircraft survivability aspect control. The method begins at step 202 and continues to step 204.

In step 204, one or more threat sensor models are provided. These models, which have been described above in relation to 104 and 106 of FIG. 1, can provide threat sensor capability and weapon system operational and performance information for use in determining a survivability aspect control signal. The threat models can be provided from a data storage aboard the aircraft or can be provided dynamically (e.g., transmitted via a wireless or wired network) from another aircraft or facility. The method continues to step 206.

In step 206, a point in the mission (or along a planned or current route) is selected. The point in the mission can represent a portion of a mission or a phase of a mission. The selection of a point in the mission can provide information such as topography and/or threats visible or present in the area of the selected point. The selected point can be based time, location, or other suitable mission location point selection factor. The method continues to step 208.

In step 208, one or more threat models are selected from among those provided in step 204. The threat models selected can be based on the mission point selected. For example, the threat models selected can be for those threats that are estimated to have current or potential visibility of the aircraft. The method continues to step 210.

In step 210, the signature exposure index (SEI) can be computed using the selected models and the selected mission point. An estimate of the signature of the aircraft for each of the threat sensors can be computed. The individual estimates can be combined into a signature exposure index representing the signature exposure of the aircraft at that mission point throughout the range of the aspect being considered. For example, the signature exposure index can show the signature exposure of the aircraft throughout the full 360° range of headings that could be flown. Alternatively, the SEI can be calculated for a subset of the range of the aspect being considered. The subset can be based on internal factors (such as mission objectives and aircraft performance characteristics) or external factors (such as terrain limiting the available heading options). Combining the threat sensor model information can be accomplished in various ways including a straight additive approach, a weighted additive approach, or other suitable or desirable method of combining the estimated exposure values for each threat sensor type. The method continues to step 212.

In step 212, an aspect or range of aspects is selected based on the SEI and one or more optional thresholds. The threshold can be selected according to a number of different criteria such as worst case for overall detection and engagement by any threat, most lethal threat, quickest responding threat, or the like. Alternatively, the aspect or range of aspects having the lowest exposure can be selected for output. The method continues to step 214.

In step 214, the aspect or range of aspects is provided as output in the form of a control or recommendation signal, as described above. The method continues to step 216, where the method ends.

It will be appreciated that the method may be repeated in whole or in part (an example of which is indicated by line 218) to accomplish a contemplated survivability aspect control process or to maintain a current (regularly or continuously updated) signal.

Figure 3:
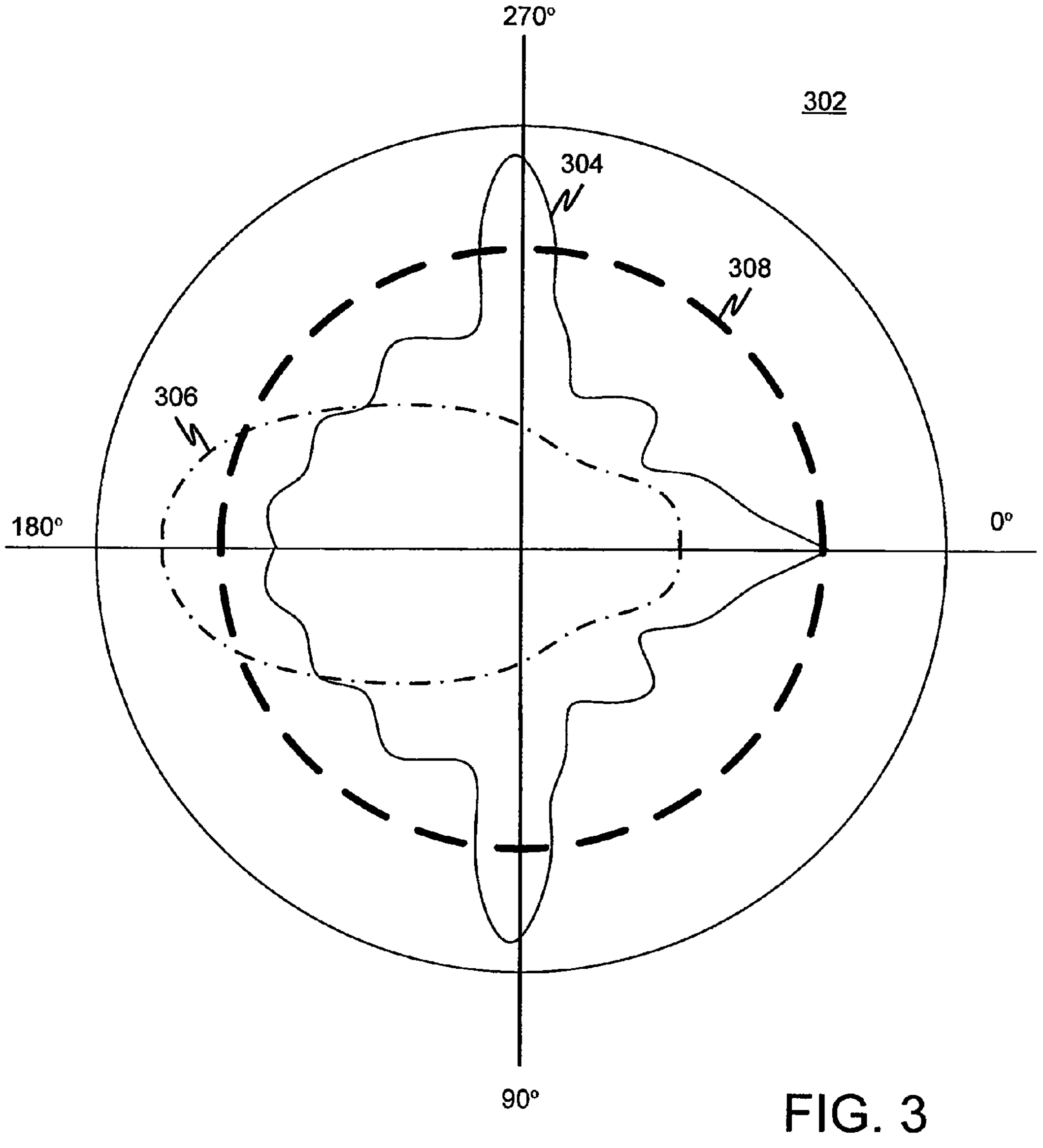
FIG. 3 is a diagram of an exemplary signature exposure index showing two representative exposure estimates and a threshold.
Figure 4:
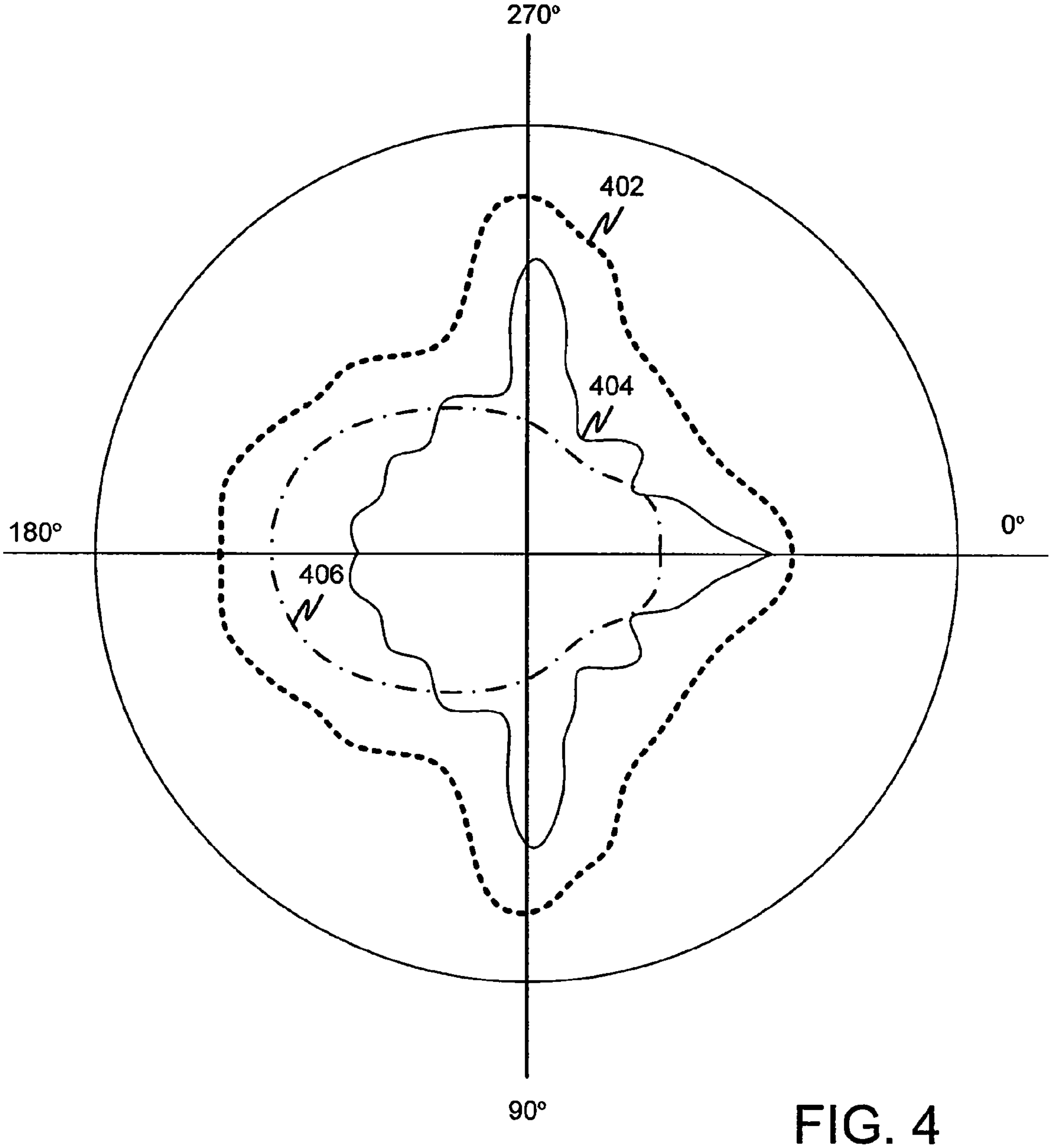
FIG. 4 is a diagram showing an exemplary signature exposure index based on a weighted combination of two threat sensor signature exposure estimates.

Certain aspects of FIGS. 3 and 4 may not be to scale, may be exaggerated, and/or may be distorted in order to better illustrate an embodiment of the invention or a feature being described.

FIG. 3 shows a diagram of an exemplary SEI (302) based on a combination of two threat sensor exposure estimates (304 and 306), along with a threshold (308) based on an estimated worst case engagement level for one of the threats, for example. The SEI 302 is a combination of the two threat sensor exposure estimates 304 and 306 and represents a radially outermost value of the combined threat signature exposure estimates 304 and 306. At the point in time or location that is represented by the diagram, the SEI 302 exceeds the threshold 308 at about the 90°, 180° and 270° headings. This would indicate that the aircraft should maintain a heading other than those shown that exceed the threshold in order to minimize or reduce the ability of a threat to detect and/or engage the aircraft. In other words, the pilot or flight management system should present an angle of the aircraft to the sensors that is not one of the angles that exceeds the threshold. In addition to being an illustration of the relationship between the SEI, sensor exposure estimates and the threshold, the diagram of FIG. 3 is representative of a type of visual or graphic display that can be used to communicate a survivability aspect control signal or recommendation to a pilot or other crew member.

FIG. 4 is a diagram showing a SEI (402) based on a weighted combination of two threat sensor signature exposure estimates (404 and 406). In particular, FIG. 4 shows that an SEI 402 may differ from a pure combination of the signature exposure estimates (404 and 406). For example, one or more of the signature exposure estimates may be scaled or weighted in order to generate an SEI having desired characteristics. The signature exposure estimates may represent an RF exposure model (404) and an infrared exposure model (406), for example.

Figure 5:
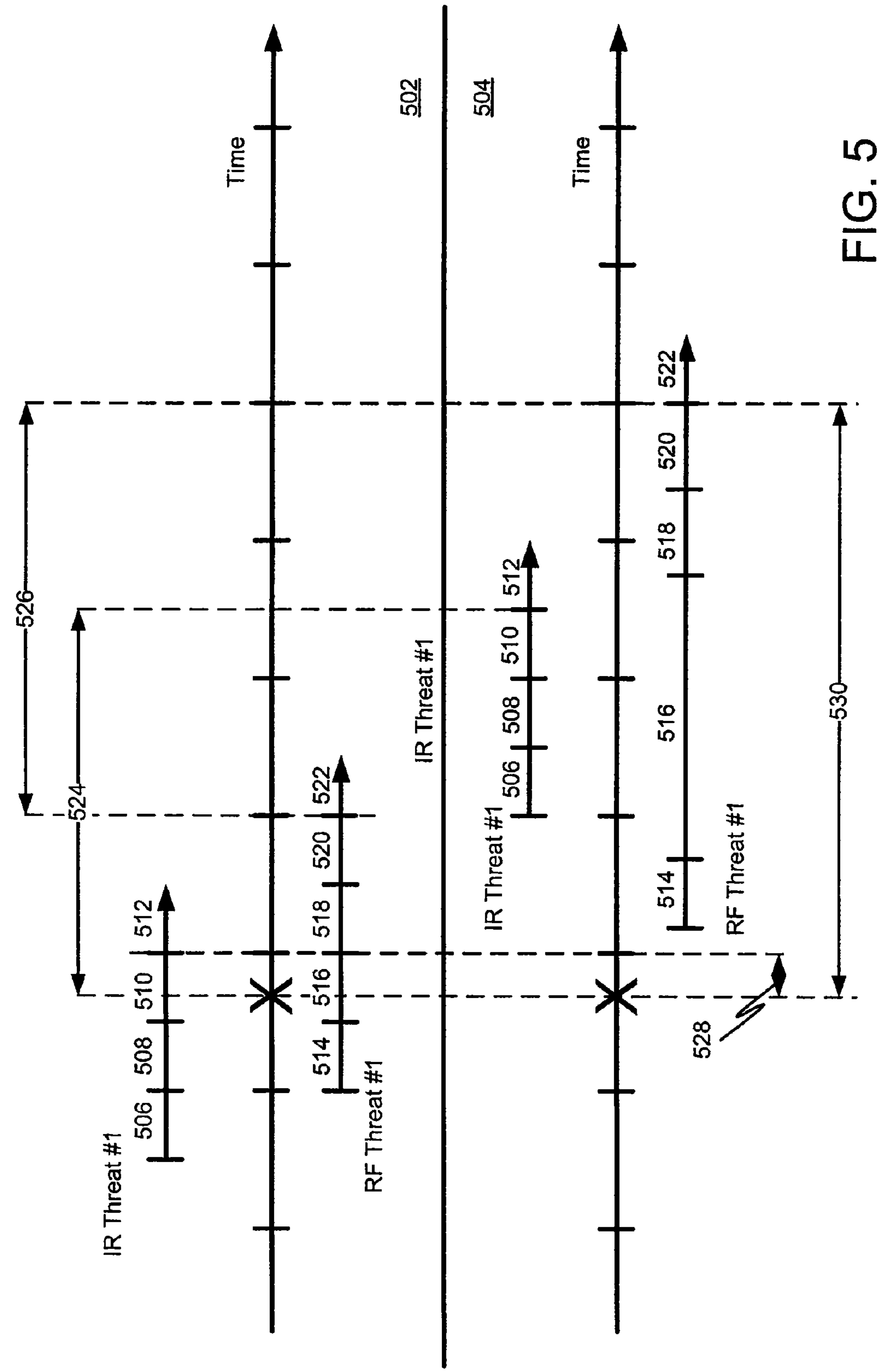
FIG. 5 is a timeline diagram showing two exemplary scenarios.

FIG. 5 is a timeline diagram showing two exemplary scenarios one based on a current aspect plan and one based on aspect plan generated by an embodiment of the aircraft survivability aspect control system. In particular, FIG. 5 shows a first timeline 502 and a second timeline 504. The second timeline 504 is based on an aspect plan generated by an embodiment of the survivability aspect control system or method.

Shown on are each timeline (502 and 504) are two threats, a first infrared (IR) threat (IR Threat #1) and a first RF threat (RF Threat #1). The first IR threat includes safe (506), detection (508), lock-on (510) and engage (512) phases. The first RF threat includes safe (514), detect (516), track (518), firing solution (520) and engage (522) phases.

The first timeline 502 (i.e., without survivability aspect control) shows an event planning horizon (528) that represents the period of time from the current time (X) until the start of the engage (512) phase of IR threat #1.

Utilizing an embodiment of survivability aspect control as shown in the second timeline 504, the IR engage phase has been delayed (524) by an amount sufficient for the aircraft to be out of range for the IR Threat #1, so this threat is no longer a factor. The engagement by RF Threat #1 has been delayed (526). Thus, by utilizing survivability aspect control in accordance with an embodiment, the event planning horizon is increased from time period 528 to time period 530. The increase in event planning horizon can result in an increased ability to complete a mission or achieve an objective, an increased ability to avoid engagement, or the like.

In addition to increased event planning horizons, a survivability aspect control system can increase areas in which it may be less costly (from a survivability viewpoint) to operate in. In other words, the area in which it may be safer to operate the aircraft or vehicle may be increased.

Figure 6:
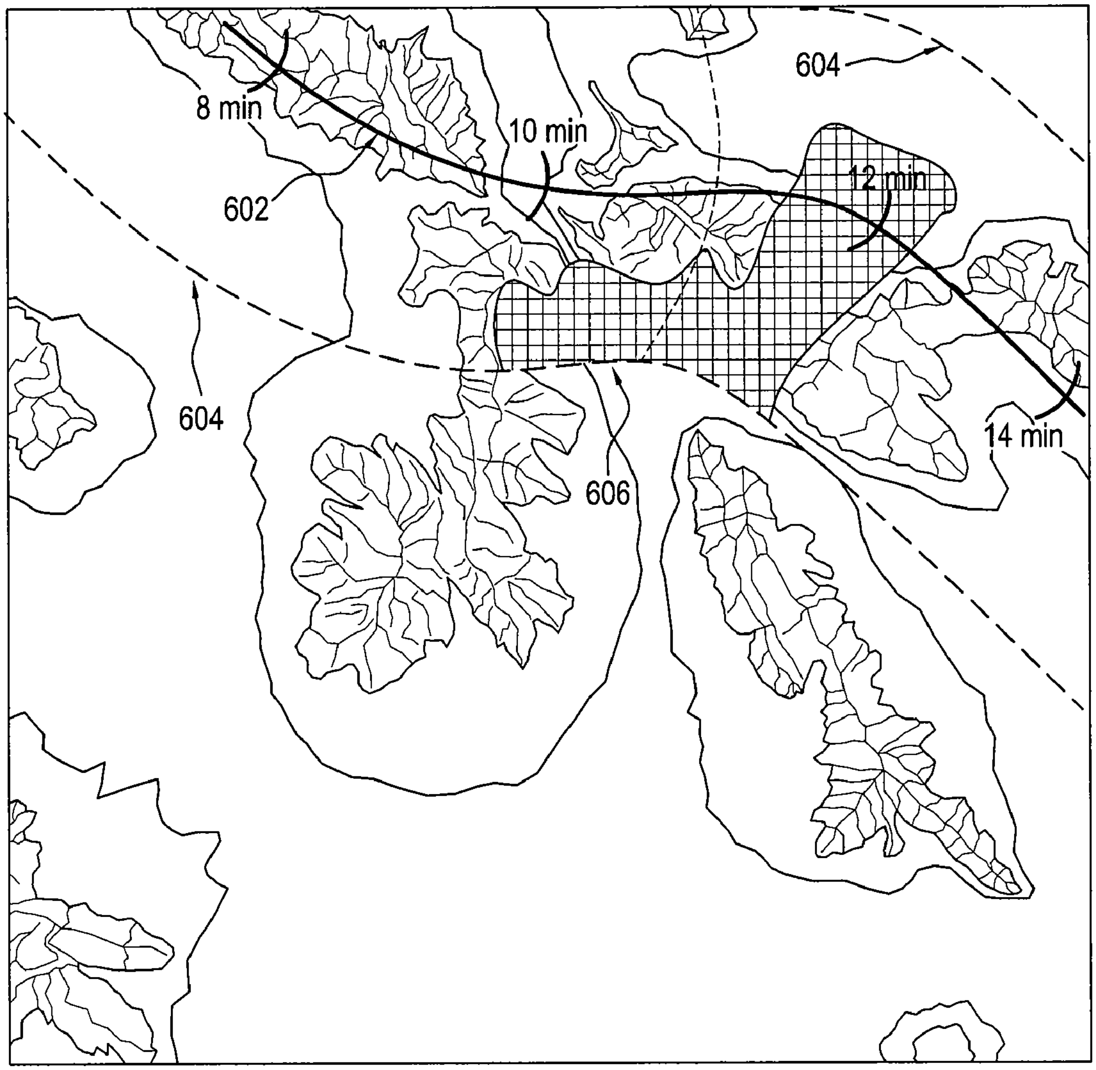
FIG. 6 shows a terrain map having a high cost region determined without aspect control.

For example, FIG. 6 shows a terrain map having a high cost region determined without aspect control. In particular, a mission route 602 is shown with tick marks indicate times during the mission corresponding to locations along the route. The mission route 602 is located within an operational corridor defined by dotted lines 604. Also shown in FIG. 6 is a high cost (or increased risk) region 606. The high cost region 606 has been determined without the benefit of survivability aspect control being applied.

Figure 7:
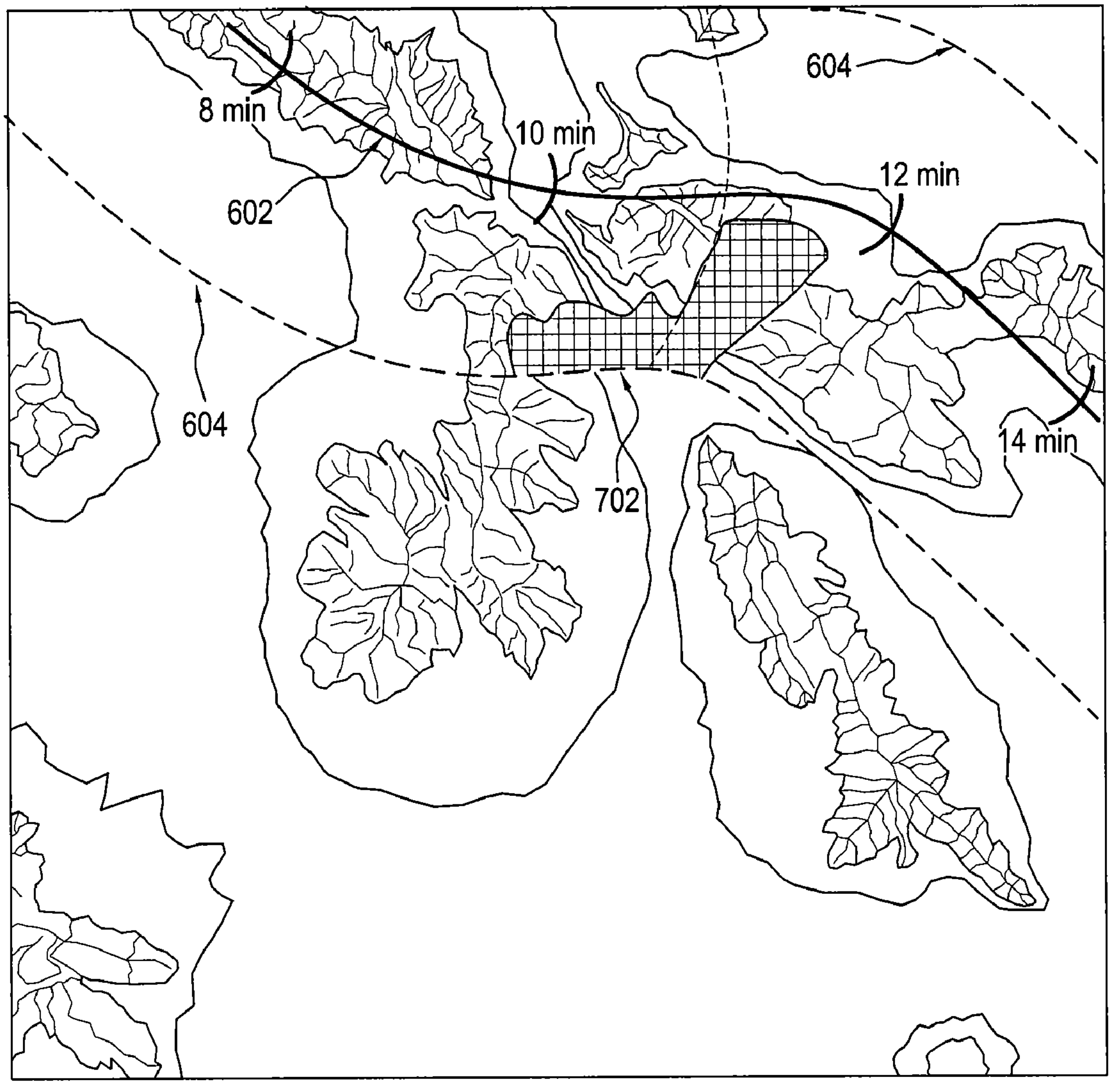
FIG. 7 shows a terrain map having a high cost region determined with aspect control applied.

FIG. 7 shows the terrain map of FIG. 6, with survivability aspect control having been applied. In particular the high cost region 606 of FIG. 6 has been reduced to a smaller high cost region 702 in FIG. 7. This reduction in size of the high cost region is a result of applying survivability aspect control. In this example, the use of survivability aspect control has reduced the size of the high cost region and provided greater flexibility in route choice and planning to avoid high cost regions. In general, an embodiment of the survivability aspect control system can be used to increase lower cost (or lower risk) operating areas and this can be communicated to a pilot or vehicle operator or used in a mission planning task. In addition to illustrating an exemplary result of survivability aspect control, FIGS. 6 and 7 also represent examples of outputs of a flight path calculating or mission planning system that incorporates a survivability aspect control system or method.

An embodiment of the aircraft survivability aspect control system or method can be incorporated into the aircraft survivability equipment (ASE) for a commercial or private aircraft. The embodiment can be included as part of another piece of equipment or can be added as an individual subsystem. In a commercial aircraft, an embodiment can make recommendations or perform maneuvers automatically for the pilot. For example, an auto-pilot feature can be selectable by pilot. Further, the ASE could be coupled to existing autopilot systems or other aircraft avionics systems. The ASE could also deploy countermeasures that may be present on commercial aircraft and control flight aspects for improved delivery or deployment of countermeasures.

In general, an aircraft survivability aspect control system can provide a control signal to the aircraft, or a recommendation indicated to a pilot of the aircraft, of a flight aspect calculated to maximize the survivability of the aircraft according to one or more predetermined inputs and formulas. The inputs to the aspect control system can include on-board (i.e., on the aircraft which is carrying the aspect control system) and/or off-board sensor data, intelligence, situational or simulation data. The aspect control system can factor one or more of these data into a flight aspect control or recommendation.

Several types of aspect control may be determined though the course of a mission including: pre-engagement and post-engagement. Pre-engagement can include those aspects selected to minimize or reduce the probability of being detected, tracked or locked-onto by a weapon system posing a potential threat to the aircraft. Post-engagement can include those aspects selected to reduce the chance of a lock-on or continued lock-on, evade munitions or missiles that have been launched or fired at the aircraft, and maximize effectiveness of one or more countermeasures, such as chaff or flares, that may be deployed against an incoming munition or missile.

The flight aspect control or indication can include one or more of yaw, pitch, roll, heading, altitude, or airspeed. The yaw or heading can be controlled or indicated such that the aircraft, if capable, may be flown with the front of the aircraft pointing in a direction other than a direction of flight. This is commonly known as "crabbing" and the amount of difference between the direction the aircraft is pointing and its flight path is known as a "crab angle." While crab angles may typically be relatively small, such as those used to account for a crosswind during landing, the yaw or heading indications for the aircraft survivability aspect control system can be more radical in nature and include angles up to 180 degrees, i.e., flying backwards, and any angles to port or starboard in between; this depends, of course, on the performance capabilities of a particular aircraft or vehicle. Aspect can also include elevation angle and/or azimuth angle between the aircraft (or vehicle) and the threat(s).

The indications for the other flight axes in addition to yaw and other operational aspects can also cover a very wide range up to and including an operational envelope of the aircraft, and may even exceed the operational envelope for a given parameter for periods of time, for example in cases of emergency or imminent threat. The range of control or recommendation signals for survivability aspect control can vary greatly due to the focus on survivability when generating the signal, as opposed to other aspects of flight such as maneuver difficulty or comfort of operation. Of course, factors such as difficulty or comfort may not be applicable to unmanned aircraft or vehicles.

The aspect control system can determine a desired aspect based on the calculation of a signature exposure index. The signature exposure index can be computed based on the signature that the aircraft presents to one or more types of sensor technologies, such as, for example, radar (or radio frequency (RF) based), infrared, sonar, video image, laser, acoustic, or any known or later developed sensor technology. Each signature can be combined according to a formula in order to arrive at a signature exposure index.

In addition to being based on a sensor type, the signature exposure index also can depend on the position of the aircraft relative to each weapon system sensor. The position of the aircraft relative to the sensor can have a significant impact on the signature presented. For example, the aircraft may present a larger (i.e., more easily detected) signature to an infrared sensor at an angle toward the rear of the aircraft where hot exhaust gases may be emitted. On the other hand, the aircraft may present large RF signatures at angles to the front and sides of the aircraft.

Also, in addition to sensor type and relative position, the aspect control system can take into account performance characteristics of a particular threat or threat type, such as estimated time-to-engagement, predicted or measured lethality, or the like. These performance characteristics can be used when determining a desired aspect. For example, a threat's estimated engagement timeline may be used to assign a priority to the threat when multiple threats are present. Threat performance characteristics may come from actual data on a threat type gathered from the field or other sources, estimated data, simulated data, or may represent a weighted or otherwise artificial characteristic selected based on a mission objective or operational parameter. For example, the estimated time-to-engagement of a threat may be increased or reduced by a factor to increase safety or decrease importance of the threat relative to the importance of a mission objective.

Thus, the aspect control system can take into account, and compute a signature exposure index, for multiple threats of a multi-spectral nature, while also taking into account the effect of relative position of the aircraft to each of the threats on the signature presented to those threats. The aspect control system can provide a discrete or continuous aspect recommendation or control signal throughout a mission.

The aspect control system can determine an optimal aspect by using a minimization function. The minimization function can combine each component of the aircraft signature (e.g., RF and infrared components). The combination can be made using an additive approach. The combination can also include factors that can modify one or more of the signature components. As mentioned above, each signature component can be weighted according to a characteristic of the weapon system that corresponds to the signature component. For example, as a weapon system is able to move closer to engaging the aircraft, its signature component can be weighed more heavily (i.e., increased in relative importance) in the minimization function.

In addition to being used while an aircraft or vehicle is in operation, an embodiment of the aircraft survivability aspect control system can be used for preflight preparation and mission planning. For example, the system may be used in a practice run of a mission conducted on the ground to help visualize and rehearse the mission. Also, the system may be used to help prepare flight plans for a mission.

The aspect control system can be used in real-time (i.e., an optimal aspect can be determined while the aircraft is in flight) or prior to flight. For example, if the types and positions of a number of threats along a mission route are known or estimated, then the aspect control system can determine, in advance of flight, optimal aspects to be flown along the mission route. The aspect control system output can be supplied to an aircraft electronically for use by the aircraft or pilot of the aircraft. If supplied in an electronic form for use by the aircraft, the aspect control system output can be used as input to a flight control or flight management system for controlling the aspect the aircraft assumes during flight. The output could also be supplied in a human readable form such as printed report or an image file for viewing by a pilot or navigator during flight. The output of the aspect control system can also be supplied to the pilot or navigator as an audio or visual cue during flight.

The aspect control system can be embodied in a separate system or subsystem in an aircraft, or incorporated into another system or subsystem of the aircraft.

It should be appreciated that any steps described above may be repeated in whole or in part in order to perform a contemplated aircraft survivability aspect control task. Further, it should be appreciated that the steps mentioned above may be performed on a single or distributed processor. Also, the processes, modules, and units described in the various figures of the embodiments above may be distributed across multiple computers or systems or may be co-located in a single processor or system.

While embodiments of the aircraft survivability aspect control system have been described for illustration purposes as reducing ownship signature to one or more weapon system sensors, it may also be possible to use an embodiment for controlling aspect to affect signature exposure for something other than reduced or minimized signature exposure. For example, it may be desirable in certain circumstances for one or more aircraft or vehicles to maximize signature exposure to "draw fire," or attempt to gain the focus of attention of a weapon system or enemy. This type of need may arise, for example, where one or more aircraft or vehicles act as a decoy or sacrifice in order to increase the chances of another aircraft or vehicle achieving a mission objective. Thus, an embodiment of the aspect control system may be used to control or recommend a flight aspect than is designed to affect the signature exposure of the aircraft anywhere along a range of minimum to maximum exposure. A selection of an exposure level to control for can also take into account a particular weapon system, a specific portion of a mission, or any other factor related to a mission.

Also, it will be appreciated that movement can be considered relative and that an embodiment of the survivability aspect control system can be used to inform how a somewhat stationary vehicle or aircraft can best position itself relative to a threat that is moving in relation to the vehicle or aircraft. In other words, the change in relative position between ownship and a threat may be generated by the movement of the threat and/or ownship movement. For example, a tank or other military ground vehicle may use an embodiment of the survivability aspect control system to control or recommend movements that can reduce the vehicle's signature exposure to a sensor onboard a more mobile threat such as a helicopter.

Embodiments of the method, system and computer program product for aircraft survivability aspect control, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for aircraft survivability aspect control.

Furthermore, embodiments of the disclosed method, system, and computer program product for aircraft survivability aspect control may be readily implemented, fully or partially, in software using, for example, object or object-oriented software development environments that provide portable source code that can be used on a variety of computer platforms. Alternatively, embodiments of the disclosed method, system, and computer program product for aircraft survivability aspect control can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for aircraft survivability aspect control can be implemented in hardware and/or software using any known or later developed systems or structures, devices and/or software by those of ordinary skill in the applicable art from the functional description provided herein and with a general basic knowledge of the computer and/or simulation arts.

Moreover, embodiments of the disclosed method, system, and computer program product for aircraft survivability aspect control can be implemented in software executed on a programmed general-purpose computer, a special purpose computer, a microprocessor, or the like. Also, the aircraft survivability aspect control method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for aircraft survivability aspect control into a software and/or hardware system.

It is, therefore, apparent that there is provided in accordance with the present invention, a method, system, and computer program product for vehicle aspect control. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A computer system for determining a survivability aspect control signal for an aircraft, said computer system comprising:

a processor; and a memory including software instructions adapted to cause the computer system to perform the steps of:

(a) providing a plurality of signature exposure models, each signature exposure model corresponding to a threat sensor and including a threat sensor characteristic and a threat operational characteristic;

(b) selecting a mission portion;

(c) selecting, based on the selected mission portion, a plurality of the provided signature exposure models, each selected signature model corresponding to a threat estimated to have current or potential visibility of the aircraft at the selected mission portion;

(d) calculating a signature exposure index based on the plurality of the provided signature exposure models and the selected mission portion, the signature exposure index being calculated by determining an individual estimate of a signature of the aircraft for each threat sensor using, the corresponding model and combining the individual estimates into the signature exposure index representing the signature exposure of the aircraft at the selected mission portion throughout a range of an aspect by representing values of the combined individual estimates; and (e) providing a survivability aspect control signal based on the signature exposure index.

2. The system of claim 1, wherein one of the signature exposure models includes a model of human perception of a characteristic of the aircraft.

3. The system of claim 1, wherein steps (a)-(e) are repeated to provide an updated signal.

4. The system of claim 1, wherein providing the aspect control signal includes providing an indication of a range of aspect values that correspond to signature exposure index values that are less than the exposure needed for engagement by any of the threats associated with the selected models.

5. The system of claim 1, wherein the survivability aspect control signal is used directly to control the aircraft.

6. The system of claim 1, wherein the survivability aspect control signal is provided in human-recognizable form.

7. A computerized method for generating a survivability aspect signal for a vehicle, the method comprising:

(a) providing a selected signature exposure model to a processor programmed to generate a survivability aspect signal for a vehicle, the selected signature exposure model being selected based on a selected mission portion and corresponding to a threat estimated to have current or potential visibility of the vehicle at the selected mission portion and to a threat sensor of the threat, and including a threat sensor characteristic and a threat operational characteristic;

(b) calculating, with the processor, a signature exposure index based on the selected signature exposure model and the selected mission portion, the signature exposure index being calculated by determining an individual estimate of a signature of the vehicle for each threat sensor using the corresponding model, and combining the individual estimates into the signature exposure index representing the signature exposure of the vehicle at the selected mission portion throughout a range, of an aspect by representing values of the combined individual estimates; and (c) providing a survivability aspect control signal based on the signature exposure index as output from the processor.

8. The method of claim 7, wherein the selected signature exposure model includes modeling perception of a characteristic of the vehicle by a human.

9. The method of claim 7, wherein the steps (a)-(c) are repeated to provide an updated survivability aspect control signal.

10. The method of claim 7, wherein the survivability aspect control signal is used directly to control the vehicle.

11. The method of claim 7, wherein the survivability aspect control signal is provided as a recommendation in human-recognizable form.

12. A computer program product for calculating an aspect control signal for a vehicle, the computer program product comprising:

a nontransitory computer readable medium encoded with software instructions that, when executed by a computer, cause the computer to perform predetermined operations, the predetermined operations including the steps of:

(a) providing a plurality of signature exposure models, each signature exposure model corresponding to a threat sensor and including a threat sensor characteristic;

(b) selecting a mission portion;

(c) selecting one or more of the models based on the selected mission portion, each selected model corresponding to a threat estimated to have current or potential visibility of the vehicle at the selected mission portion;

(d) calculating a signature exposure index based on the one or more selected models and the selected mission portion, the signature exposure index being calculated by determining an individual estimate of a signature of the vehicle for each of the threat sensors using the corresponding model, and combining the individual estimates into the signature exposure index representing the signature exposure of the vehicle at the selected mission portion throughout a range of an aspect by representing values of the combined individual estimates; and (e) providing an aspect control signal based on the signature exposure index.

13. The computer program product of claim 12, wherein one of the signature exposure models includes a model of human perception of a characteristic of the vehicle.

14. The computer program product of claim 12, wherein steps (a)-(e) are repeated by the computer to provide an updated signal.

15. The system of claim 1, wherein the aircraft is a fixed-wing aircraft.

16. The system of claim 1, wherein the aircraft is a rotor craft.

17. The system of claim 1, wherein the aircraft is a UAV.

18. The computer program product of claim 12, wherein the signature exposure model includes a threat operational characteristic that is used to calculate the signature exposure index.

19. The method of claim 7, wherein the vehicle is a ground transport vehicle.

20. The system of claim 1, wherein the range of the aspect used in calculating the signature exposure index is a subset of a full range that could be flown, the subset based on mission objectives and aircraft performance characteristics.

21. The system of claim 1, wherein the aspect control signal indicates a heading for the aircraft to be flown with the front of the aircraft pointing in a direction other than the direction of flight.

22. The system of claim 1, wherein the aspect control signal includes pitch.

23. The system of claim 1, wherein the aspect control signal includes roll.

24. The system of claim 1, wherein the aspect control signal is selected to maximize signature exposure to draw fire.

* * * * *